(12) United States Patent
Okumura et al.

(10) Patent No.: US 10,988,876 B2
(45) Date of Patent: Apr. 27, 2021

(54) CUSHION PAPER (71) Applicant: Tomoegawa Co., Ltd., Tokyo (JP)

(72) Inventors: Katsuya Okumura, Tokyo (JP); Hajime Tsuda, Shizuoka (JP)

(73) Assignee: Tomoegawa Co., Ltd, Tokyo (JP)

( * ) Notice: Subject to any disclaimer, the term of this patent is extended or adjusted under 35 U.S.C. 154(b) by 35 days.

(21) Appl. No.: 16/466,097

(22) PCT Filed: Jan. 10, 2018

(86) PCT No.: PCT/JP2018/000298
§ 371 (c)(1),
(2) Date: Jun. 3, 2019

(87) PCT Pub. No.: WO2018/131592
PCT Pub. Date: Jul. 19, 2018

(65) Prior Publication Data
US 2020/0063302 A1    Feb. 27, 2020

(30) Foreign Application Priority Data

Jan. 16, 2017  (JP) .............................. JP2017-004770

(51) Int. Cl.
*D04H 1/4234* (2012.01)
*D21H 13/48* (2006.01)

(52) U.S. Cl.
CPC ........... *D04H 1/4234* (2013.01); *D21H 13/48* (2013.01); *D10B 2101/20* (2013.01); *D10B 2401/061* (2013.01)

(58) Field of Classification Search
CPC .................................................. D04H 1/4234
(Continued)

(56) References Cited

U.S. PATENT DOCUMENTS 3,513,069 A    5/1970  Arledter
3,713,787 A *  1/1973  Kuniyasu ................. B01J 35/02
                                                          428/600
(Continued)

FOREIGN PATENT DOCUMENTS

CN      101962874 A    2/2011
JP       54040674 B2   12/1979
(Continued)

OTHER PUBLICATIONS

Kimura et al., TW I412641 B, machine translation, Oct. 21, 2013, entire machine translation (Year: 2013).*
(Continued)

*Primary Examiner* — Humera N. Sheikh
*Assistant Examiner* — Katherine A Christy
(74) *Attorney, Agent, or Firm* — Wood Herron & Evans LLP

(57) ABSTRACT

The present invention provides a cushion member and a stage member provided with the cushion member, the cushion member including a non-woven fabric formed by binding or entangling metal fibers, wherein when the cushion member is compressed, the cushion member undergoes compressive deformation and the following compressive deformation ratio is 5% to 80%:

Compressive deformation ratio=$(T0-T1)/T0\times 100$,

T0: film thickness of cushion member before application of load, and
T1: film thickness of cushion member after application and release of load.

7 Claims, 3 Drawing Sheets

(58) Field of Classification Search
USPC .......................................................... 428/605
See application file for complete search history.

(56) References Cited

U.S. PATENT DOCUMENTS

| | | | |
|---|---|---|---|
| 4,900,877 | A | 2/1990 | Dubrow et al. |
| 6,249,941 | B1 | 6/2001 | Krupnik et al. |
| 6,495,258 | B1 | 12/2002 | Chen et al. |
| 6,502,289 | B1 | 1/2003 | Kane et al. |
| 2011/0299942 | A1 | 12/2011 | Schild, III et al. |

FOREIGN PATENT DOCUMENTS

| | | | |
|---|---|---|---|
| JP | 57042741 | B2 | 9/1982 |
| JP | 06076389 | | 10/1994 |
| JP | 08055904 | A | 2/1996 |
| JP | 4257004 | B2 * | 4/2009 |
| JP | 4257004 | B2 | 4/2009 |
| TW | I412641 | B * | 10/2013 |

OTHER PUBLICATIONS

Katsuro, JP 4257004 B2, machine translation, Apr. 2009, entire machine translation (Year: 2009).*

Zhou, W. et al., Compressive properties of porous metal fiber sintered sheet produced by solid-state sintering process, Materials and Design, 2011, vol. 35, pp. 414-418.

Xie Sujiang et al., Progress in Research on Sealing Material Properties of Compressed Non-Abestos Fiber Rubber Gasket, Graduate School of Chemical and Mechanical Engineering at East China University of Science and Technology, 2003(5), pp. 5-11.

PCT Office, International Search Report issued in PCT/JP2018/000298 dated Mar. 27, 2018, 3 pages.

Taiwan Patent Office, Office Action issued in TW 107101054 dated Aug. 8, 2018, 7 pages.

European Patent Office, Search Report issued in EP 18738478.9 dated Aug. 7, 2020.

Chinese Patent Office, Office Action issued in CN 201880005168.8 dated Jan. 6, 2021.

* cited by examiner

PRIOR ART

FIG. 5

CUSHION PAPER

TECHNICAL FIELD

The present invention relates to cushion paper.
Priority is claimed on Japanese Patent Application No. 2017-004770, filed Jan. 16, 2017, the content of which is incorporated herein by reference.

BACKGROUND ART

In the related art, in order to maintain the parallelism of compressive members in devices, elastic members such as springs or resin rings have been used. For example, in the device disclosed in Patent Literature 1, a washer is used to maintain the parallelism between a pedestal and a laminated member.

CITATION LIST

Patent Literature

[Patent Literature 1]
Japanese Unexamined Patent Application, First Publication No. H8-55904

SUMMARY OF INVENTION

Technical Problem

In the device of Patent Literature 1, because a seal ring groove is formed at an end portion of the pedestal and it has a laterally asymmetrical structure, it is difficult in terms of design to make a device having various constituent parts with a symmetrical structure. Since a cushion member constituted of a metal plate member such as a spring and a washer has a large repulsive force against a load, minute distortion is caused due to the asymmetric structure.

In view of the above problems, an objective of the present invention is to provide a cushion member (cushion paper) that causes less distortion between members due to its structure even when a device has an asymmetric structure.

Solution to Problem

As a result of intensive research, instead of an elastic member formed of a metal plate member such as a spring or a washer, the inventors of the present invention have conceived of a new cushion member by paying attention to compressive deformation characteristics of the cushion member. That is to say, the present invention includes the following aspects.

<1> A cushion member which includes a non-woven fabric formed by binding or entangling metal fibers, wherein when the cushion member is compressed, the cushion member undergoes compressive deformation and the following compressive deformation ratio is 5% to 80%: Compressive deformation ratio=(T0−T1)/T0×100, where T0 is the film thickness of the cushion member before application of a load and T1 is the film thickness of the cushion member after application and release of the load.

<2> The cushion member according to <1>, wherein when compression occurs due to compressive stress higher than the compressive deformation, elastic deformation occurs together with the compressive deformation.

<3> The cushion member according to <1> or <2>, wherein the compressive deformation ratio is 10% to 75%.

<4> The cushion member according to any one of <1> to <3>, wherein after the load is restored, the following restoration ratio at 72 hours after release of the load is 15% to 100%: Restoration ratio=(T2−T1)/(T0−T1)×100, where T0 is the film thickness of the cushion member before application of the load, T1 is the film thickness of the cushion member after application and release of the load, and T2 is the film thickness of the cushion member at 72 hours after release of the load.

<5> The cushion member according to any one of <1> to <4>, which is annular.

<6> The cushion member according to any one of <1> to <5>, wherein the following space factor of the cushion member is 1 to 40%: Space factor (%) of cushion member= (true density of thickness/material of basis weight/cushion member)×100.

<7> A stage member which includes the cushion member according to any of <1> to <6> provided therein.

Advantageous Effects of Invention

Unlike springs, washers, and the like, a cushion member of the present invention has a characteristic of compressively deforming in accordance with compressive stress immediately after such compressive stress is applied, acts as a cushion between members due to low rebound deformation, and hardly causes distortion between members. Such distortion can be corrected through compressive deformation corresponding to distortion between the members.

Also, the cushion member of the present invention compressively deforms immediately after a compressive stress is applied by a load, and at this stage, hardly generates a repulsive force due to elastic deformation and is hardly displaced. For this reason, it is unnecessary to provide an accommodation groove for preventing misalignment in an installation member of the cushion member.

DESCRIPTION OF EMBODIMENTS

Cushion paper associated with the present invention (which is synonymous with "cushion member," and will hereinafter be appropriately referred to as a cushion member) will be described below, but the description of the specification and the drawings is an explanation of the present invention, and does not unduly limit the scope of the present invention.

[Cushion Member[

Figure 1:
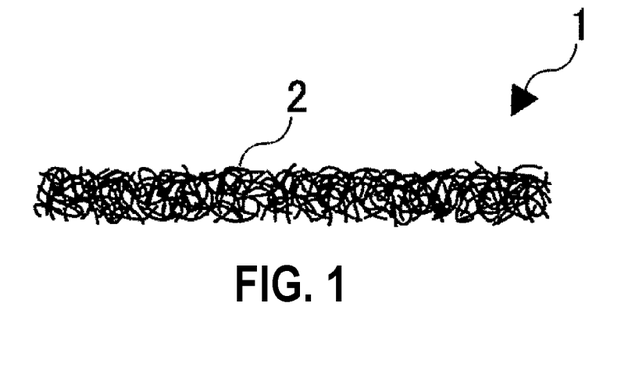
FIG. 1 is a cross-sectional view illustrating a cushion member according to an embodiment of the present invention.

The cushion member in the present invention is made of a non-woven fabric constituted by binding or entangling metal fibers and has many gaps between the metal fibers. In this respect, it is fundamentally different from cushion members formed of a metal plate member such as a spring. FIG. 1 is a cross-sectional view illustrating a cushion member 1 and the cushion member 1 is constituted by binding a plurality of metal fibers 2.

Figure 2:
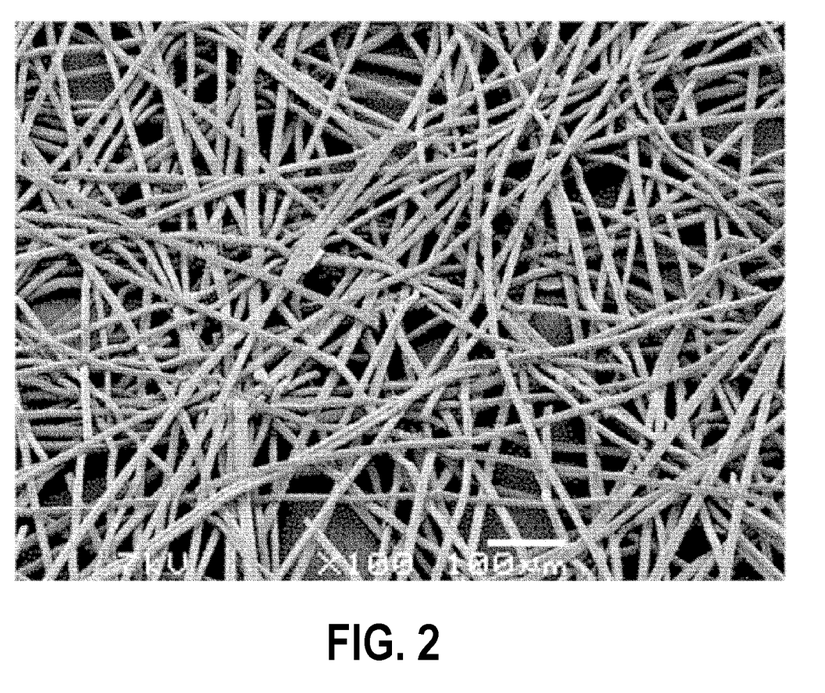
FIG. 2 is a photograph illustrating a cushion member according to the embodiment of the present invention.

The binding of the plurality of metal fibers 2 means that at least some of the metal fibers 2 may be bonded to each other and the metal fibers 2 may be fused to each other. Furthermore, the entangling of the metal fibers means that the metal fibers may not be bonded but may be entangled with each other as long as the metal fibers are physically in contact with each other. To be specific, the cushion member 1 includes a non-woven fabric in which the metal fibers 2 are not woven, but does not include a woven fabric obtained by weaving a plurality of metal fibers 2 like a mesh or a metal foil. Among these, non-woven fabrics are preferable in view of favorably expressing compressive deformation. FIG. 2 is a photograph illustrating the cushion member. As described with reference to FIG. 1, it is shown that there are gaps between the metal fibers.

A type of the metal fibers 2 is not particularly limited, but examples thereof include metals such as aluminum, copper, titanium, nickel, gold, platinum, and lead and alloys such as stainless steel and brass. Among these, stainless steel can be suitably used in view of appropriate conductivity, resistance to oxidation, processability, and the like. The metal fibers 2 may be of a single type or a plurality of types may be used in combination. Furthermore, surface treatments such as plating may be performed on the above metals and alloys in accordance with their purpose.

An average fiber length of the metal fibers 2 is determined in accordance with the application of the cushion member 1, but is preferably 500 μm to 10 mm. When the average fiber length is 500 μm or more, the fibers are easily entangled, and when the average fiber length is 10 mm or less, it is possible to make a structure having uniform gaps. It should be noted that "the average fiber length" in this specification is, for example, a value obtained by measuring fiber lengths of 20 metal fibers using a microscope and averaging the measured values.

Similarly, an average diameter of the metal fibers 2 is determined in accordance with the application thereof, but when the average diameter is generally 1 μm to 50 μm, it is possible to maintain an appropriate fiber strength, which is desirable in view of developing suitable deformability. It should be noted that "the average diameter" in this specification is, for example, a value obtained by measuring diameters of 20 metal fibers by a microscope and averaging the measured values.

The metal fibers 2 may be directly bonded to each other without using a binder as long as a cushioning property of the cushion member is not lost or may be bonded via a binder. Examples of the binder include an inorganic adhesive such as colloidal silica, water glass, and sodium silicate in addition to an organic binder such as an acrylic adhesive, an epoxy adhesive, and a urethane adhesive.

The metal fibers 2 are partially in contact with each other and are not wholly in contact with each other. For this reason, gaps are formed in the cushion member 1. A volume ratio of the metal fibers 2 in the cushion member 1 is defined as a space factor as follows.

Space factor (%) of cushion member=(basis weight/thickness of cushion member/true density of material)×100

The space factor is an important factor because a compressive deformation ratio which will be described later is affected by the space factor. Although an appropriate space factor varies in accordance with the application, the space factor is preferably 1% to 40%, more preferably 4% to 20%. When the space factor is 1% or more, a minimum amount of metal fibers can be secured, and when the space factor is 40% or less, a cushioning material is not too rigid and compressive deformation can easily occur.

When compressing an elastic member such as a conventional spring, the elastic member deforms along with elastic deformation. That is to say, the elastic member generates a repulsive force. On the other hand, the cushion member associated with the present invention is characterized in that the cushion member has compressive deformation characteristics as a result of having both rigidity of a metal fiber and flexibility due to an air gap. The cushion member of the present invention causes compressive deformation when compressed. For example, when the cushion member of the present invention is compressed under a load of 1 MPa, compression deformation occurs. A head speed (a moving speed of a load) of the compression device is, for example, 1 mm/minute.

"Compressive deformation" in the present invention refers to deformation occurring after a load (a compressive stress) is applied to the cushion member and the load is released. Elastic deformation is not included in the "compressive deformation" of the present invention because elastic deformation is restored immediately upon release of the load. For this reason, "plastic deformation" and "deformation restoring over a long period of time but not immediately restoring" are included in the compressive deformation of the present invention. It can be said that compressive deformation occurs when the cushion member is compressed by a load and the load is released, for example, after 1 minute if a film thickness of the cushion member is decreased. Unlike a spring or the like which does not plastically deform but elastically deforms when subjected to a load, the cushion member of the present invention compresses and deforms in accordance with a load immediately after application of a load (a compressive stress)

When a device structure in which a cushion member is provided is asymmetric, if a spring or the like is provided between compressive members such as in a clamp, the spring elastically deforms against a compressive force and thus absorbs the compressive force, whereas a repulsive force increases. Therefore, the effect of correcting distortion between members is small. On the other hand, the cushion member of the present invention has a small repulsive force because the cushion member is compressively deformed with respect to a compressive force, and has a large effect of correcting distortion between members, thereby making it very useful.

A compressive deformation ratio indicating a degree of compressive deformation of the cushion member is defined as follows.

Compressive deformation ratio=$(T0-T1)/T0 \times 100$

T0 is a film thickness of the cushion member before application of a load and T1 is a film thickness of the cushion member after application and release of a load. A higher compressive deformation ratio of the cushion member of the present invention is desirable because the cushioning property is better when the compressive deformation ratio is higher. However, an upper limit is preferably 80% or less, more preferably 75% or less.

When the upper limit is 80% or less, the cushion member does not excessively compress and deform and can have room left for elastic deformation which will be described later. On the other hand, in order to ensure cushioning properties, a lower limit is at least 5% or more, preferably 10% or more, more preferably 23% or more, and particularly preferably 35% or more.

Also, the cushion member of the present invention compressively deforms immediately after a compressive stress is applied by a load, and at this stage, neither a repulsive force due to compressive deformation nor misalignment easily occurs. For this reason, it is unnecessary to provide accommodation grooves for preventing misalignment in an installation member of the cushion member. On the other hand, since this effect is not provided for a spring or the like which elastically deforms (which is not compressive deformation) with respect to a compressive stress, it is necessary to provide accommodation grooves for preventing misalignment in these elastic members.

Furthermore, it is desirable that the cushion member of the present invention not only compressively deform but also elastically deform together with compression deformation when compressed by a higher compressive stress than the compressive deformation. By exerting a repulsive force against the compression member due to elastic deformation, the cushion member can appropriately act as a support between the members.

The cushion member of the present invention undergoes compressive deformation when compressed, but due to the characteristics of the metal fibers bonded or entangled with each other, the cushion member of the present invention has a characteristic of restoring the reduced film thickness after a long period of time in some cases. The long period of time is, for example, 72 hours after the above load application and release. Due to this restorability, for example, when a distance between the compressive members is increased due to reduction of the pressure of the compressive members due to compression deformation of the cushion member, it is possible to follow the displacement of the compressive members due to a restoring ability and a gap does not easily occur between the compressive members.

$$\text{Restoration ratio} = (T2-T1)/(T0-T1) \times 100$$

T0 is a film thickness of the cushion member before application of a load, T1 is a film thickness of the cushion member after application and release of a load, and T2 is a film thickness of the cushion member at 72 hours after release of a load. A higher restoration ratio is desirable because the restoration ratio can follow the displacement of the compressive members when the restoration ratio is higher. The restoration ratio is preferably from 15% to 100%, more preferably from 20% to 100%, most preferably from 70% to 100%.

A thickness of the cushion member is appropriately changed in accordance with the application, but for example, the thickness thereof is 30 μm to 3 mm, more preferably 500 μm to 2 mm.

It should be noted that "the thickness of the cushion member" in this specification refers to, for example, an average value of an arbitrary number of measuring points of the cushion member when the arbitrary number of measuring points thereof are measured using a film thickness gauge (for example, Digimatic indicator "ID-C 112X" manufactured by Mitutoyo Co., Ltd.) of a terminal dropping method by air.

A three-dimensional shape of the cushion member of the present invention is not particularly limited in accordance with its use and examples thereof include a sheet shape, a roll shape, a spherical shape, a string shape, a polygonal shape, a net shape, a ring shape, and the like. These shapes may coexist and may be, for example, a combination of a string shape and a spherical shape. Among them, an annular shape in which the cushion member can be disposed around the internal structure of the device is desirable.

The cushion member is appropriately used as a cushion member between members requiring fine parallelism and can also be used as a substitute for gaskets, washers, and the like. The cushion member of the present invention can be appropriately provided on a stage member requiring cushioning properties.

A stage member is generally required to have flatness, and specifically, an adsorption stage, a mechanical adsorption stage, an electrostatic adsorption stage, and the like can be exemplified.

□Method for Manufacturing Cushion Member□

A method for manufacturing a cushion member of the present invention will be described below, but this is merely one example of a manufacturing method and any manufacturing method may be used as long as the cushion member of the present invention is obtained. Examples of the manufacturing method include a method of compressively molding a metal fiber and obtaining a non-woven fabric by making paper out of a raw material containing a metal fiber using a wet paper making method.

In the case of obtaining a cushion member through compression molding, a sheet can be formed through compression or the like of an aggregate of metal fibers obtained by a card method, an air laid method, or the like. At this time, a binder may be impregnated between the fibers to impart bonding between the fibers. Examples of such a binder include, but are not particularly limited to, inorganic binders such as colloidal silica, water glass, sodium silicate, and the like, in addition to organic binders such as acrylic adhesives, epoxy adhesives, urethane adhesives, and the like. It should be noted that, instead of impregnating with a binder, a surface of a fiber may be coated with a thermally adhesive resin in advance and an aggregate of metal fibers may be pressurized and heated and compressed after the aggregate is laminated.

It is also possible to prepare a cushion member through a wet paper making method in which a metal fiber or the like is dispersed in water and is spread. To be specific, a slurry is prepared mainly from a metal fiber, then a filler, a dispersant, a thickener, a defoaming agent, a paper strength enhancer, a sizing agent, a coagulant, a coloring agent, a fixing agent, and the like are appropriately added to the slurry, and the slurry is wet-papermaking-processed in a paper machine. As the paper machine, it is possible to use a cylinder paper machine, a Fourdrinier machine, a Sharp net paper machine, an inclined paper machine, or a combination paper machine obtained by combining the same paper machines or different paper machines among them. A sheet can be obtained by drying wet paper after papermaking using an air dryer, a cylinder dryer, a suction drum dryer, an infrared type dryer, or the like.

When the wet paper making method is used, it is desirable to perform production through a fiber-entangling treatment step of entangling components mainly composed of metal fibers forming a sheet containing moisture on a net. Here, as the fiber-entangling treatment step, for example, it is desirable to adopt a fiber-entangling treatment step of jetting a high-pressure jet water stream on a surface of a wet paper metal fiber sheet. To be specific, it is possible to entangle fibers composed mainly of metal fibers over the entire sheet by arranging a plurality of nozzles in a direction orthogonal to a direction in which a sheet flows and simultaneously jetting a high-pressure jet water stream from the plurality of nozzles.

Also, it is desirable that a metal fiber non-woven fabric obtained through the compression molding or the wet paper making method is sintered by a sintering step of performing sintering at a temperature equal to or lower than a melting point of the metal fiber in a vacuum or in a non-oxidizing atmosphere. By fusing contact points between the metal fibers, it is possible to increase the strength of a self-heating layer after sintering and the self-heating property and the processing suitability at the time of applying electricity are improved.

The metal fibers used for sintering may form one layer or a plurality of layers. In the case of sintering a plurality of layers, there is an advantage in that a thick film cushion member can be easily obtained.

Example

A cushion member will be described below on the basis of examples and comparative examples, but the present invention is not limited to the content of examples. It should be noted that measurement content of physical properties of a sheet-like cushion member obtained in examples is as follows.

<Space Factors>

Dimensions of short sides and long sides of cushion members were measured using a JIS 1 grade scale. Thicknesses of the cushion members were measured by measuring the thicknesses of the cushion members at nine points using a Digimatic indicator "ID-C 112X" manufactured by Mitutoyo Co., Ltd. with a measuring element of φ15 mm and an average value of the nine points was taken as a sheet thickness. Furthermore, weights of the obtained cushion members were measured using an electronic balance.

From the above dimensions, thicknesses, and weights, bulk densities were calculated as follows.

Bulk density=(weight of cushion member/(short side of cushion member×long side of cushion member×thickness of cushion member)

Using the above bulk density, space factors of the cushion members were calculated as follows.

Space factor=bulk density of cushion member/true weight of material×100

<Compressive Deformation Ratio and Restoration Ratio>

Test pieces formed of cushion members of 30 mm square were prepared and film thicknesses of the test pieces before compression were measured using a Digimatic indicator "ID-C 112X" manufactured by Mitutoyo Co., Ltd. with a measuring element of φ15 mm. At the time of film thickness measurement, thicknesses of the test pieces were measured only once by moving a probe slowly downward so that only a weight of the probe itself was applied to the test piece and the probe was brought into contact with the test pieces (measurement of T0).

Subsequently, the test pieces were compressed using a stainless steel compression plate having a diameter of 100 mm as a jig and using a 1 kN load cell. A compression rate was 1 mm/min, a compressive stress was gradually increased from 0 MPa to 1 MPa (900 N), and then compression and release operations of the test pieces to be released were continuously performed three times. From "a stress-strain chart" obtained through this test, the actual strain to stress was calculated and an amount of compressive deformation was calculated in accordance with the following expression.

Amount of compressive deformation=(strain at the first rising portion)−(strain at the second rising portion)

The rising portion is a strain when the compressive stress increases from 2.5 N (the rising portion ideally needs to be 0 MPa to prevent an error). The film thicknesses of the test pieces were measured using a micrometer and T1 was calculated from a difference between each of these film thicknesses and each of the film thicknesses of the test pieces before compression using the film thicknesses as amounts of compressive deformation. It should be noted that, after compression, a film thickness after releasing a load was measured 1 minute after releasing. A test piece after completion of the test was stored in an air-conditioned environment (at 23±5° C. and 55±15% humidity).

Finally, a film thickness of the test piece stored for three days (72 hours) under an air conditioning environment was measured using the above micrometer. The film thickness at this time was defined as "a film thickness three days after the test" (measurement of T2).

From T0, T1, and T2 obtained by the above measurements, a compressive deformation ratio and a restoration ratio were calculated on the basis of the following expression.

Compressive deformation ratio=(T0−T1)/T0×100

Restoration ratio=(T2−T1)/(T0−T1)×100

T0 is a film thickness of the cushion member before application of a load, T1 is a film thickness of the cushion member after application and release of a load, and T2 is a film thickness of the cushion member at 72 hours after release of a load.

Example 1

60 g of a fiber bundle obtained by cutting a bundled article obtained by bundling stainless steel long fibers having a fiber diameter of 8 μm with polyvinyl alcohol to have a fiber length of 3 mm and 1 g of polyvinyl alcohol fiber were dispersed in water to obtain a slurry solution. The slurry solution was poured into a paper-making net to have a basis weight of 270 g/m² and a dewatered and dried cushion member was obtained so that only a minimum pressure necessary at the time of transportation was applied. This cushion member was heated in a hydrogen atmosphere at a sintering temperature of 1120° C. for one hour and a cushion member in a cushion member form was obtained. Since a portion in which entanglement of fibers was non-uniform was present on an outer circumferential portion of the obtained cushion member, a metal fiber cushion member having a well-formed shape was obtained by cutting and removing the non-uniform portion. Physical properties of this cushion member are illustrated in Table 1.

Example 2

A cushion member was obtained in the same manner as in Example 1 except that the basis weight of the slurry solution of Example 1 was changed from 270 g/m² to 300 g/m².

Example 3

Two cushion members prepared as in Example 2 were stacked and ten 100 μm polyethylene terephthalate films laminated as a thickness-adjusting spacer were placed between compression plates of a pressing machine to surround four sides of the cushion members. Subsequently, a thick film cushion member was obtained by performing pressing using a hydraulic press machine at 110 MPa for five minutes at room temperature. Physical properties of this cushion member are illustrated in Table 1.

Examples 4 and 5

Cushion members were prepared in the same manner as in Example 3 except that the number of laminated sheets of the cushion member in Example 3 was changed from two sheets to three sheets in Example 4 and four sheets in Example 5. Physical properties of these cushion members are illustrated in Table 1.

Figure 3:
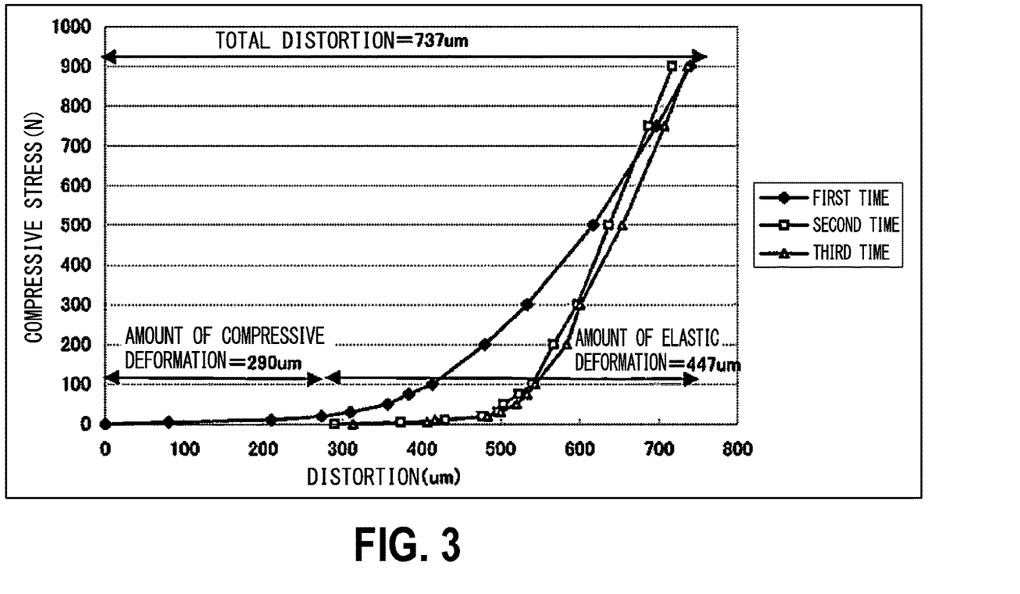
FIG. 3 is a stress-strain chart according to an example.

FIG. 3 illustrates "a stress-strain chart" associated with the calculation of a compressive deformation ratio and a restoration ratio for the cushion member obtained in Example 4. In FIG. 3, the results of each time associated with a compression/release operation in compressive deformation ratio measurement are illustrated in respective graphs. As illustrated in FIG. 3, at the time of first compression, a load is gradually increased from 0 MPa to 1 MPa, and after releasing the load, at the time at which second compression is started, elastic deformation is released, compression strain (T1) of 290 μm is shown, and an amount of elastic deformation is 447 μm.

Comparative Examples 1 and 2

Cushion members were prepared in the same manner as in Example 3 except that the number of laminated cushion members in Example 3 was changed from two to seven in Comparative Example 1 and from two to eleven in Comparative Example 6. Physical properties of these cushion members are illustrated in Table 1.

Example 6

An aggregate of copper fibers was obtained by cutting a copper wire having a fiber diameter of 18.5 μm to have a length of 10 mm. A slurry solution was obtained by dispersing the copper fibers in water and then adding a polyacrylamide solution to the mixture as a viscosity-adjusting agent. This solution was poured into a paper-making net to have a basis weight of 300 g/m² and a dewatered and dried cushion member was obtained so that only a minimum pressure necessary at the time of transportation was applied. Subsequently, this cushion member was heated in a hydrogen atmosphere at 1020° C. for one hour and a cushion member in a sheet form was obtained. Since a portion in which entanglement of fibers was non-uniform was present on an outer circumferential portion of the obtained cushion member, a cushion member having a well-formed shape was obtained by cutting and removing the non-uniform portion.

Example 7

A cushion member was prepared in the same manner as in Example 6 except that, after the dewatering/drying step in Example 6, a step of performing a room temperature press using a roll press machine at a linear pressure of 240 kg/cm and a speed of 3 m/min was added.

Comparative Example 3

Figure 4:
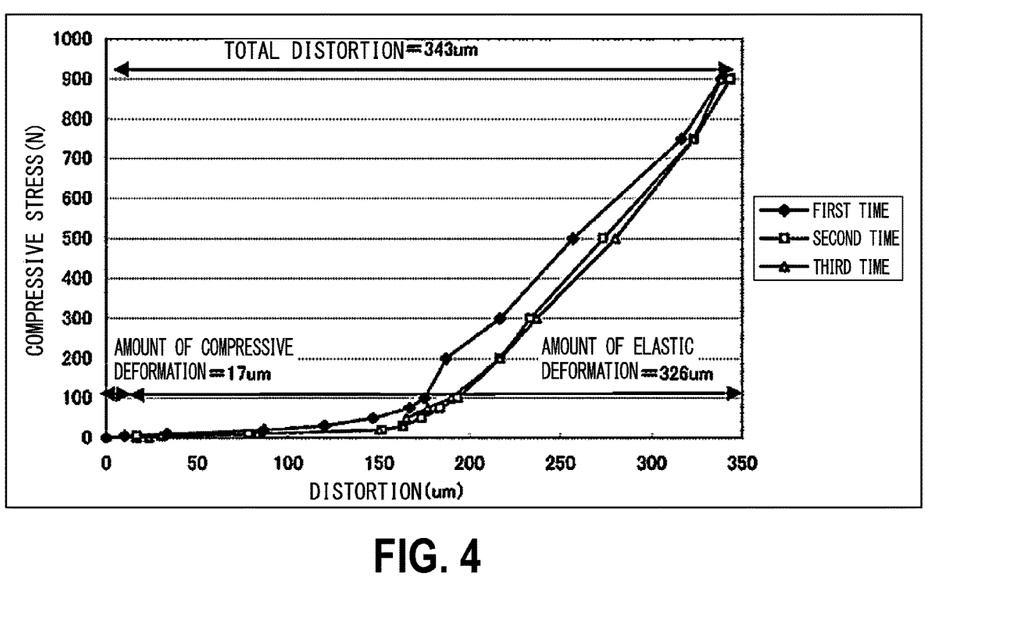
FIG. 4 is a stress-strain chart according to an example.

Physical properties were measured on a plain-woven copper mesh (#100) with a fiber diameter of 110 μm and a mesh size of 144 μm in the same manner as in Example 1. FIG. 4 illustrates "a stress-strain chart" associated with Comparative Example 3. The copper mesh had a very small compressive deformation ratio of 2.9% and a poor cushioning property.

Comparative Example 4

Figure 5:
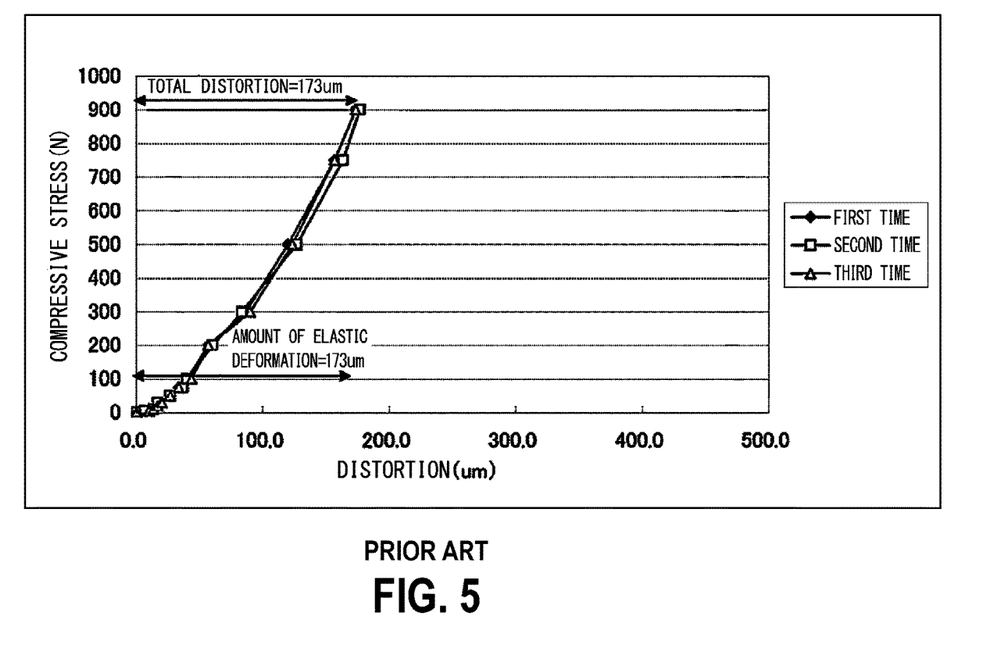
FIG. 5 is a stress-strain chart according to a comparative example.

Physical properties of a rolled copper sheet with a thickness of 500 μm were measured in the same manner as in Example 1. FIG. 5 illustrates "a stress-strain chart" associated with Comparative Example 1. As illustrated in FIG. 5, the rolled copper sheet did not elastically deform and was fundamentally different from the metal fiber sheet of the examples.

TABLE 1

| | Metal fiber | Thickness before compression (μm) | Space factor (%) Bulk density (g/cm³) | Compressive deformation ratio (%) Amount of compressive deformation (μm) | Restoration ratio (%) |
|---|---|---|---|---|---|
| Example 1 | Stainless steel | 801 | 4.2 0.33 | 79.8 632 | 15.5 |
| Example 2 | | 790 | 4.4 0.35 | 74.3 587 | 16.0 |
| Example 3 | | 718 | 10.2 0.80 | 58.9 423 | 71.4 |
| Example 4 | | 766 | 14.5 1.15 | 37.9 290 | 99.3 |
| Example 5 | | 851 | 17.7 1.40 | 23.5 200 | 100 |
| Comparative Example 1 | | 995 | 28.0 2.21 | 4.7 47 | 100 |
| Comparative Example 2 | | 1064 | 38.8 3.06 | 1.9 20 | 100 |
| Example 6 | Copper | 332 | 1.03 0.92 | 59.7 193 | 20.3 |
| Example 7 | | 167 | 19.4 1.73 | 47.9 90 | 50 |
| Comparative Example 3 | — (Copper mesh) | 229 | 30.3 2.71 | 2.9 6.7 | 100 |
| Comparative Example 4 | — (Copper plate) | 500 | 100 8.93 | 0 0 | — |

[Checking Distortion of Stainless Steel Plate]

The workpieces in the above examples and comparative examples were cut into circular shapes with outer diameters of 320 mm and inner diameters of 300 mm, placed on a stainless steel plate having an O-ring provided thereon, further covered with a stainless steel plate from above, and fixed using screws. In addition, the distortion of the stainless steel plate was checked.

As a checking means, a stainless steel plate was irradiated with light from a fluorescent lamp. Subsequently, it was checked whether the distortion occurring in an image of the fluorescent lamp was reflected on the stainless steel plate.

First, in the case of using the metal plate of Comparative Example 4 in which the compressive deformation ratio was 0%, the distortion was observed in the image of the fluorescent lamp on a surface of the stainless steel plate. Since the metal plate did not undergo compressive deformation, the metal plate did not exhibit the cushioning properties. As a result, distortion occurred in the stainless steel plate.

On the other hand, when the cushion members of Examples 1 to 7 were used, the distortion was not checked in the image of the fluorescent lamp. This was because the metal fiber cushion also corrected the minute distortion generated at the time of screw fastening and the precise planarity was realized.

With regard to the compressive deformation ratios, the compressive deformation ratios of the cushion members of Examples 1 and 2 were as high as 79.8% and 74.3% and the restoration ratios were low values at 15.5% and 16.0%. The cushion members had very high cushioning properties against compressive stress.

Next, the cushion member of Example 3 had a compressive deformation ratio of 58.9%, which was lower than those of Examples 1 and 2 but was a sufficient value, and a restoration ratio of 71.4%, which was a very high value. That is to say, the cushion member of Example 3 had (1) cushioning properties against compressive stress and had (2) a deformed thickness being restored after releasing the load (after 72 h), exhibited a repulsive force against the compressive member of the cushion member after releasing the load, and had excellent followability when the compressive member was displaced.

Also, it was confirmed that a compressive deformation ratio of the cushion member of Example 4 was further decreased to 37.9%, but the restoration ratio thereof was 99.3%, which was substantially complete restoration to the thickness before compression and a compressive deformation ratio of the cushion member of Example 5 was 23.5% and a restoration ratio thereof was 100%, which was substantially complete restoration to the thickness before compression. Also in Example 5, a restoration ratio of 100% is illustrated. On the other hand, in the cushion members of Comparative Examples 1 and 2, the compressive deformation ratio was as low as 4.7% and 1.9% and the cushioning properties were poor.

Also, in Examples 6 and 7, the cushion members were prepared using copper fibers, and as a result, the cushion members were able to exhibit good compressive deformation ratios. Furthermore, in Comparative Examples 3 and 4, when a copper mesh and a copper plate which are not a non-woven fabric were measured instead of the cushion members, it was confirmed that the compressive deformation ratio was as low as 2.9% and 0%, and they did not show the cushioning properties.

REFERENCE SIGNS LIST

1 Cushion member
2 Metal fiber

The invention claimed is:

1. A cushion member comprising a non-woven fabric formed by binding or entangling metal fibers having an average diameter of 8 μm to 18.5 μm, wherein
when the cushion member is compressed, the cushion member undergoes compressive deformation and the following compressive deformation ratio is 5% to 80%:

compressive deformation ratio=$(T0-T1)/T0 \times 100$,

T0: film thickness of cushion member before application of load, and

T1: film thickness of cushion member after application and release of load, wherein the film thickness of the cushion member before application and release of load is measured by moving a probe of a digital indicator so that only a weight of the probe itself is applied to a test piece of the cushion member, the film thickness of the cushion member after application and release of load is measured after three-times compression at 1 kN load, a compression rate of 1 mm/min, and a gradual increase of a compression stress from 0 MPa to 1 MPa, thereby obtaining a stress-strain chart from which an actual strain to stress is calculated and an amount of compressive deformation is calculated in accordance with the following expression:

amount of compressive deformation=(strain at the first time rising portion)−(strain at the second rising portion).

2. The cushion member according to claim 1, wherein when compression occurs due to compressive stress higher than the compressive deformation, elastic deformation occurs together with the compressive deformation.

3. The cushion member according to claim 1, wherein the compressive deformation ratio is 10% to 75%.

4. The cushion member according to claim 1, wherein after the load is restored, the following restoration ratio at 72 hours after release of a load is 15% to 100%:

Restoration ratio=$(T2-T1)/(T0-T1) \times 100$

T0: film thickness of cushion member before application of load,

T1: film thickness of cushion member after application and release of load, and

T2: film thickness of cushion member at 72 hours after release of load.

5. The cushion member according to claim 1, which is annular.

6. The cushion member according to claim 1, wherein the following space factor of the cushion member is 1 to 40%:

Space factor (%) of cushion member=(true density of thickness/material of basis weight/cushion member)×100.

7. A stage member which includes the cushion member according to claim 1 provided therein.

* * * * *